Dec. 19, 1950     H. M. BRAMBERRY     2,534,407
COOKING UTENSIL SURFACE FORM AND CHARACTER
Filed April 4, 1946     5 Sheets-Sheet 1
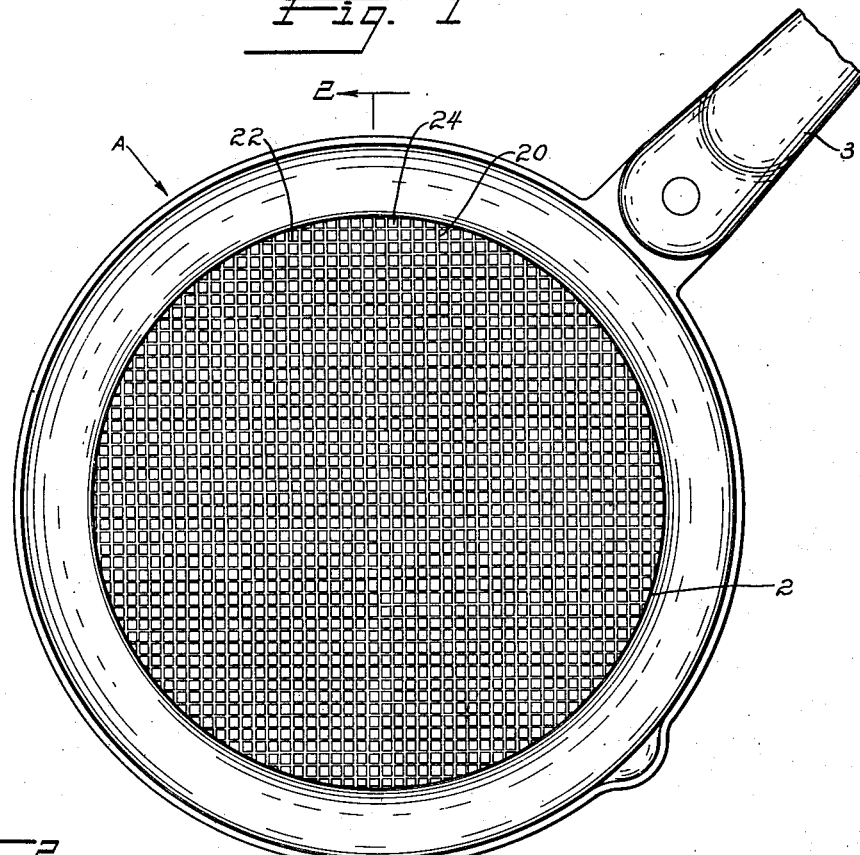
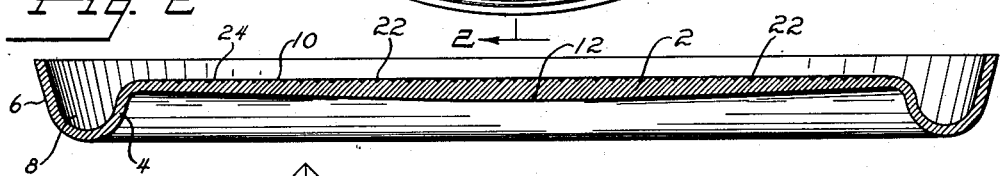
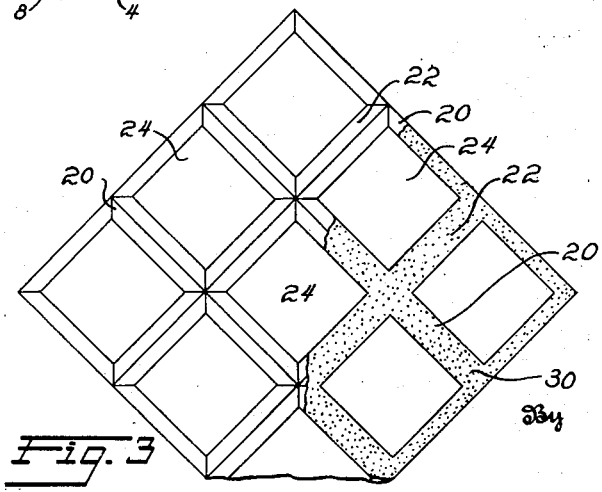
Inventor
Harry M. Bramberry
By Scrivener & Parker
Attorneys Dec. 19, 1950  H. M. BRAMBERRY  2,534,407
COOKING UTENSIL SURFACE FORM AND CHARACTER
Filed April 4, 1946  5 Sheets-Sheet 2

Inventor
HARRY M. BRAMBERRY

By Scrivener & Parker
Attorneys

Dec. 19, 1950 H. M. BRAMBERRY 2,534,407
COOKING UTENSIL SURFACE FORM AND CHARACTER
Filed April 4, 1946 5 Sheets-Sheet 3
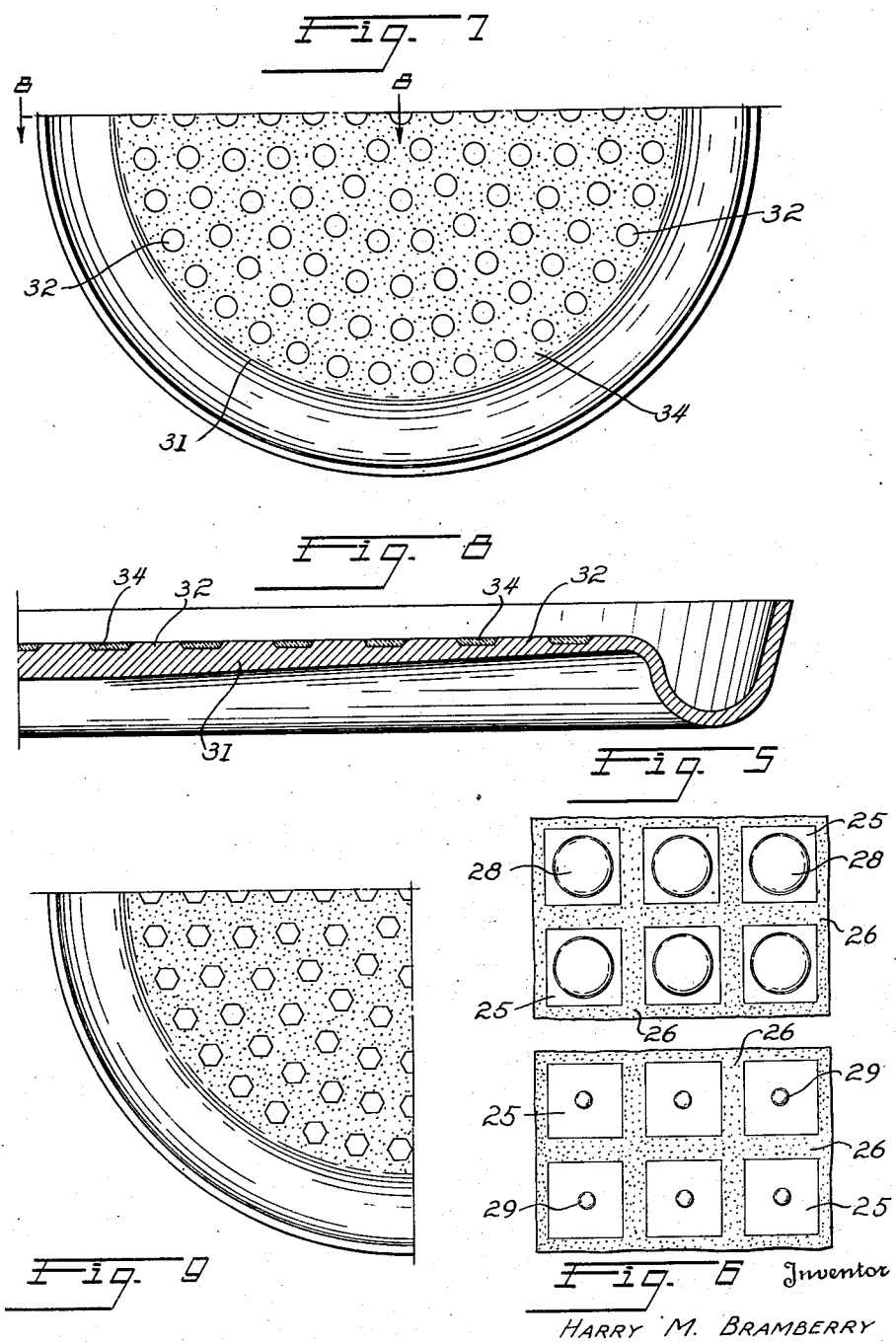

Dec. 19, 1950 — H. M. BRAMBERRY — 2,534,407
COOKING UTENSIL SURFACE FORM AND CHARACTER
Filed April 4, 1946 — 5 Sheets-Sheet 4

INVENTOR.
HARRY M. BRAMBERRY
BY
Scrivener & Parker
ATTORNEYS

Dec. 19, 1950        H. M. BRAMBERRY        2,534,407
COOKING UTENSIL SURFACE FORM AND CHARACTER
Filed April 4, 1946        5 Sheets-Sheet 5
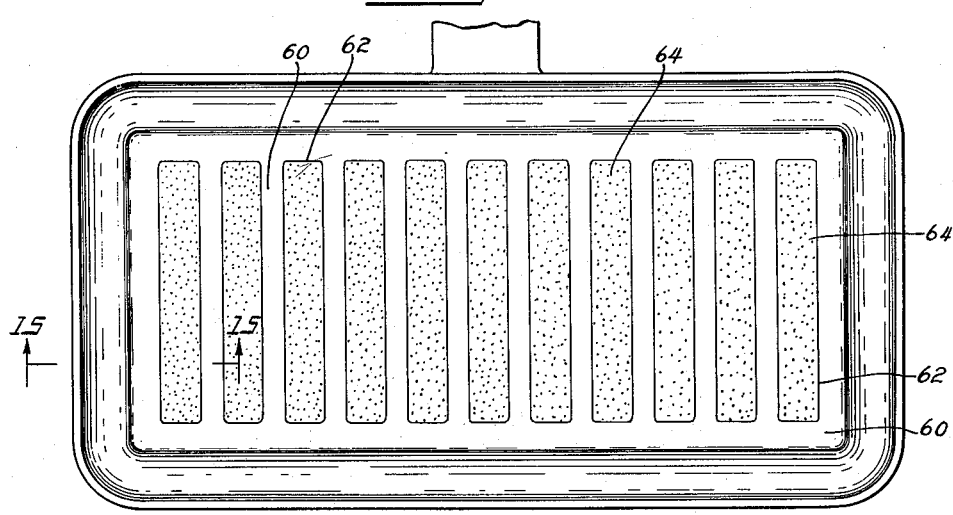
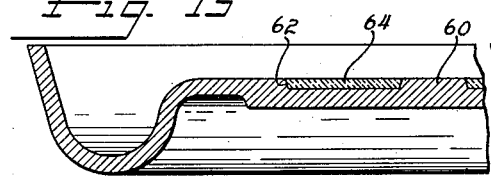 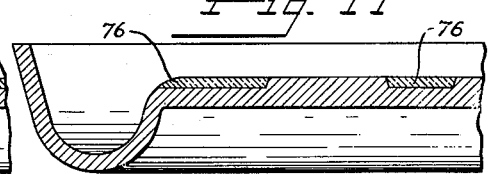
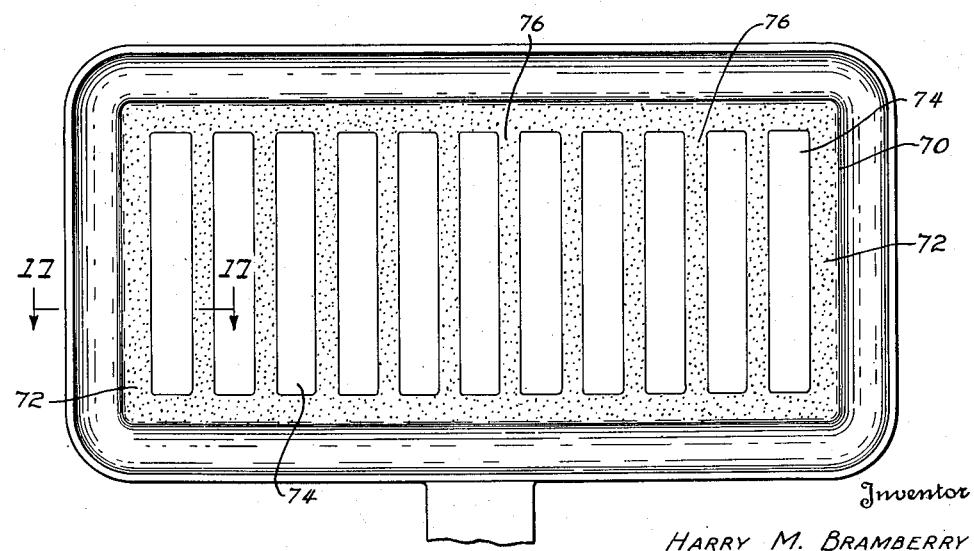
Inventor
HARRY M. BRAMBERRY
By Scrivener & Parker
Attorneys Patented Dec. 19, 1950

2,534,407

UNITED STATES PATENT OFFICE 2,534,407

COOKING UTENSIL SURFACE FORM AND CHARACTER

Harry M. Bramberry, New Castle, Ind.; Harry M. Bramberry, Jr., administrator of said Harry M. Bramberry, deceased, assignor, by direct and mesne assignments, to himself Application April 4, 1946, Serial No. 659,562

7 Claims. (Cl. 126—390)

This invention relates to cooking utensils of all types on or in which food is adapted to be cooked and, more particularly, relates to the so-called "bottom" of such utensils, which is the horizontal surface on which the food is placed to be cooked.

The principal object of the invention has been to provide a cooking utensil having a bottom, or cooking surface, the upper surface part of which is constructed in a new manner whereby cooking may be effected with a minimum amount of heat and grease, or without the application of grease, without burning the food or causing it to stick to the bottom.

A further object of the invention has been to provide a cooking surface which may be wetted while hot, in order to permit adequate and substantially uniform greasing over all parts of the surface and under all cooking conditions.

A still further object of the invention has been to provide a cooking utensil having a bottom portion so constructed that a substantially uniform temperature exists over the entire upper surface thereof when heat is applied to its lower surface.

A still further object of the invention has been to provide a cooking utensil for broiling or frying which is constructed in a new and improved manner permitting the use of forged, cast or sheet aluminum or similar metal having relatively high heat conductivity, which materials have not heretofore been entirely satisfactory when employed in cooking utensils for such purpose.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a plan view of a cooking utensil constructed in the preferred manner according to my invention;

Fig. 2 is a sectional view taken on line 2—2 of Fig. 1;

Fig. 3 is an enlarged view showing part of the upper surface of the bottom of a cooking utensil according to my invention, showing the grooves partially filled;

Figs. 5 and 6 are enlarged views of a portion of a cooking surface formed according to my invention, showing the action of grease applied thereto;

Fig. 7 is a partial plan view of the bottom part of a cooking utensil constituting a modified form of the invention;

Fig. 8 is an enlarged sectional view taken on line 8—8 of Fig. 7;

Fig. 9 is a view which is similar to Fig. 7 but shows a further modification having to do with the shape of the so-called plateau areas;

Fig. 14 is a plan view of a cooking utensil constructed in accordance with a further modification of the invention;

Fig. 15 is an enlarged sectional view taken on line 15—15 of Fig. 14; and

Figure 4:
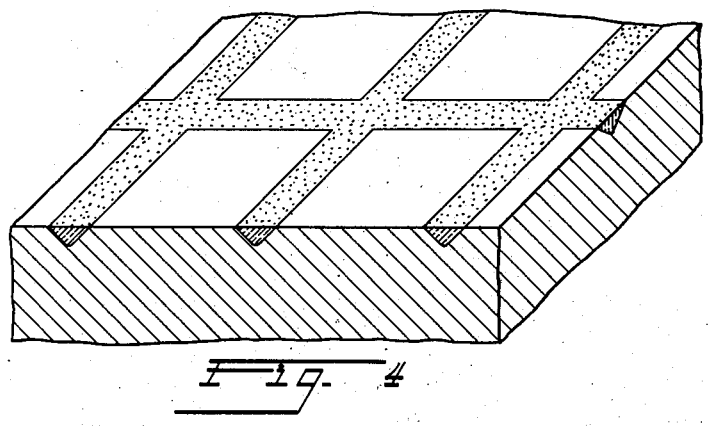
Fig. 4 is a perspective view of part of the upper portion of the bottom of a cooking utensil formed according to my invention, showing the grooves therein with the filling material in the grooves.

Figs. 16 and 17 correspond respectively to Figs. 14 and 15 but show a further modification of the invention.

In its broad aspect, my invention consists in the provision of a cooking utensil having a bottom part on which food is placed to be cooked, the upper surface of which is formed and constructed in a manner which I have called "characterized and filled" or "relieved and filled." The characteristic feature of such construction is that the upper part of the bottom consists of a plurality of isolated or substantially isolated members which are preferably integral with the material of the bottom, extend generally upwardly therefrom and the "relieved" space between which is filled, to a substantially flush condition, with a material of less heat conductivity than that of the material forming the bottom and such isolated or substantially isolated members. In a preferred embodiment of the invention I form such relieved space by grooving the upper surface of the bottom of the utensil, but such relieved space may be formed by machining, casting or coining, or by otherwise forming upstanding parts on the flat upper surface of the bottom.

One embodiment of my invention is disclosed in Figs. 1 to 4 of the drawings and comprises a frying pan or grill of circular shape in plan having a bottom part 2, on the upper surface of which food is adapted to be placed to be cooked, and a handle 3. In the illustrated embodiment the peripheral portion of the bottom 2 is formed downwardly at 4 and then upwardly at 6 to provide a grease trap or gutter 8 which preferably entirely surrounds the bottom part. The outer wall 6 is preferably extended upwardly above the level of the upper surface 10 of the bottom 2.

In accordance with the invention substantially the entire upper surface of the bottom part 2 is formed in a manner which I term "characterized and filled" or "relieved and filled." In effecting this in a preferred manner, such upper surface is scored by a plurality of parallel grooves 20 extending in one direction and by a second plurality of parallel grooves 22 extending angularly to the grooves 20, thus forming a plurality of separated plateau areas 24 each of which is bounded on all sides by the grooves 20, 22. There is thus formed a surface comprising separated plateau areas traversed by a network or grid of interconnected grooves, all being underlaid by the homogeneous, ungrooved material of the bottom of the cooking utensil.

In further accordance with the invention the relieved areas, i. e., the grooves 20, 22, are filled with a material 30 which has less heat conductivity than the metal of the bottom and plateaus. The grooves are filled to a condition in which the filling material is substantially flush with the upper surface 10 of the bottom 2. I have found that if this filling material is porous the cooking surface will have materially improved greasing characteristics, whereby any non-greasy food may be cooked with a minimum amount of grease. However, a non-porous filling material may be used if such improved greasing characteristics are not important, without sacrificing other advantages flowing from the invention. I prefer to use a material which may be chemically bonded to metal, whereby it will, in effect, become an integral part of the bottom or of the surfaces of the grooves. One filling material which may be used is the compound described and claimed in my co-pending application Serial No. 555,378, filed September 22, 1944, which comprises, in general, an emulsion containing finely ground graphite, a resin binder, a solvent for the resin binder, an emulsifier and phosphoric acid. Such a material becomes bonded to the metal of the bottom by reaction between the phosphoric acid of the material and the metal bottom upon baking at 450° F. for one hour. It is true that the original, raw resin binder will soften at a temperature from 155° F. to 170° F. However, in applying the filling material to the relieved cooking surface, such material is baked at 450° F. for one hour as stated above. This changes the resin binder to carbon, and subsequent cooking operations at high temperature do not affect this carbon in any way.

In Figs. 3 and 4 of the drawings there are shown the details of the preferred relieved and filled surface provided by the invention. As shown in the drawings, the grooves are preferably V-shaped in cross-section and, also preferably, they extend at right angles to each other forming rectangular, preferably square, plateau areas. Diamond-shaped plateau areas have also been found to give good results. The bottoms of the grooves are preferably formed with a small radius, as shown in Fig. 4. I have found that good results are achieved if the total relieved area, i. e., the total area of the grooves measured at the upper surface 10 of the bottom 2, is between 40% and 50% of the total area of the part of such upper surface which is formed in accordance with my invention, and if the grooves are from .010 to .030 inch in depth. I have found that best results are probably obtained when the exposed plateau areas are approximately .135 inch square and the channels or grooves are .040 inch wide, when measured at the upper surfaces of the plateau areas, and are .020 inch deep. These dimensions will provide the bottom with an upper cooking surface of which 60% consists in plateau area and 40% is relieved and filled. I also prefer that the grooves be arranged at an acute angle, preferably 45°, to the longitudinal center-line of the handle 3, as shown in the drawings, in order that when a spatula is pushed across the bottom in the usual direction of operation of such devices, as shown by arrow A in Fig. 1, it will not tend to remove filling material from the grooves.

Figure 4A:
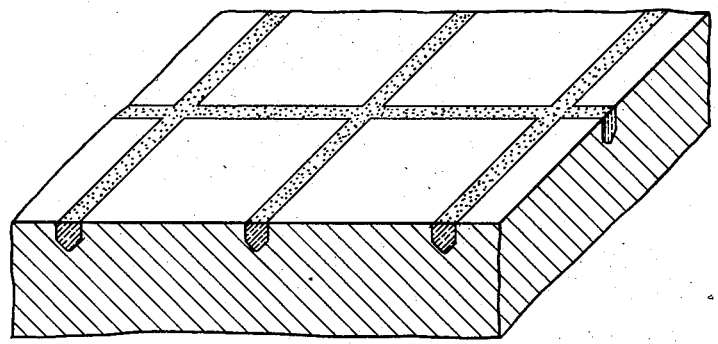
Figs. 4A and 4B are similar to Fig. 4 but show different forms of grooves.
Figure 4B:
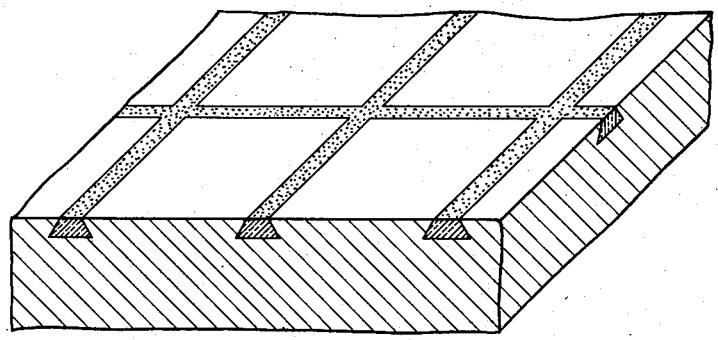

In a further embodiment of the invention the grooves may be formed and filled in a manner other than that described above. In this modification the side walls of the grooves are formed in order to more firmly hold the filling material therein. In Fig. 4A of the drawings the side walls are parallel and at right angles to the upper surface of the cooking plate and then converge to form a groove having a V-shaped bottom, while in Fig. 4B the divergent or undercut side walls are connected by a flat surface, forming a groove having a flat bottom. Grooves of these types may be filled in the manner and with the materials hereinbefore described. However, such grooves may be filled in another manner taught by the invention, in which elongated rods formed of the desired filling material and having cross-sectional size and shape corresponding to those of the grooves, are inserted lengthwise into the grooves. These rods may be bonded to the side walls and bottoms of the grooves, if desired, in any suitable manner. In another manner of forming a cooking utensil according to the invention the grooves may be filled by a pre-cast grid of rods formed of the proper material and pressed, in one piece, into the network of grooves.

It will be seen that if the cooking plate, or bottom, or a cooking utensil is formed in the described preferred manner it will consist in a homogeneous lower part lying below the bottom of the grooves and an upper part consisting of a plurality of raised parts extending upwardly from the lower part and each of which is separated from adjacent similar parts by interconnected grooves filled with material of the described characteristics. The upper surface of the bottom of the cooking utensil will comprise a plurality of isolated plateau areas, which are the upper surfaces of the raised parts referred to, and which are separated by a grid of interconnected bands of the described material. If heat is applied to the lower surface of the bottom it will flow freely in all directions through the lower part of the bottom, i. e., the part below the bottoms of the grooves, and will flow equally to each of the raised parts, whereby each of such parts becomes an independent heat dissipator, all of which draw heat equally from the reservoir of heat in the homogeneous, ungrooved, lower part of the bottom. Thus, all points of the upper surface of the bottom part of a cooking utensil formed according to my invention are at substantially the same temperature when heat is applied to the lower surface of the bottom.

The construction of the cooking plate of a cooking utensil in the manner taught by this invention has the effect of permitting or causing the cooking of food thereon without burning or sticking. This important result is believed to be due to two phenomena which result from such construction, these being: (1) the ability of the upper surface of such a cooking plate to be substantially fully wetted while hot without using an excess amount of grease, and (2) the formation, between each plateau area of the cooking surface and the lower surface of the food being cooked, of a pocket of vapor which effectually holds up the overlying area of the food.

With respect to the first phenomenon mentioned above, it is known that a heated, smooth glass or metal surface cannot be evenly wetted by grease or other liquid, due to the effect of the heat on the surface tension of the thin layer of grease or liquid on the surface. The only useful method of improving this effect, other than by the use of an excess of grease, has been by etching the surface, as by sand or vapor blasting, and even this method does not produce good results. The very marked increase in the wettability of a surface by construction in accordance with this invention is believed to be due to the fact that such surface is broken up into a plurality of separated or substantially separated plateau areas each of which is of sufficiently small size that it acts as a separate, isolated heating element, whereby it is separately and efficiently wetted. The observed phenomena of wetting of such small areas is illustrated in Figs. 5 and 6 of the drawings, in each of which are disclosed, in enlargement, six plateau areas 25 bounded by bands of filling material 26. If grease is spread on a heated cooking surface including these six plateau areas, it will so divide itself that a substantially equal amount will appear on each plateau area as a pool 28, as shown in Fig. 5, thus in effect uniformly covering the entire cooking surface and fully wetting the same. If, now, the surface is wiped to remove these pools and the heating is continued, smaller and thinner pools 29, as shown in Fig. 6, will form in the center of each plateau area, thus continuing the substantially equal distribution of the grease over the cooking surface. This more uniform distribution on a surface formed in accordance with this invention is believed to be one of the principal causes of the observed phenomenon that food may be cooked on such a surface with a minimum amount of grease without causing burning or sticking.

Oil or grease which is put onto the cooking surface provided by the invention is absorbed into the filling material but, of course, is not absorbed into the metallic plateau areas 24. If the cooking surface is wiped off, the oil or grease on the plateau surfaces 24 and the filling material will be removed, but that absorbed into the filling material will remain there. If the cooker plate is now heated, oil or grease will be driven to the surface of the filling material. Some of it will remain there and some of it will flow onto the adjacent plateau surfaces 24 where it will form into droplets, as shown in Fig. 5, because of its surface tension. The plateau areas are very small and as the oil or grease collects on each of these and also on the surface of the filling material, the cooking plate is substantially uniformly wetted throughout its entire area, which has not heretofore been possible with a hot, flat cooking surface. It is true that the effect is that of substantial uniform distribution over the entire surface, rather than the establishment of a truly wettable surface. However, these two effects are equivalent.

The second phenomenon mentioned above is believed to be as important as the first. I have observed that when food is placed on a heated surface formed in accordance with this invention the heat rising from the plateau areas generates steam or other vapor above its upper surface, forming a pocket thereof between each plateau area and the lower surface of the food, which tends to lift the lower surface of the food away from the surface of the plateau area. The formation of such pockets does not occur above the relieved and filled areas because of the lower heat conductivity through such areas. Consequently the vapor in the pockets is trapped and can escape only by passing upwardly through the food. The rate of formation of the vapor is greater than its escape through the food and thus the food is held away from the cooking surface. The upward movement of the vapor of course assists this effect. It is to be noted, in addition, that the upward passage of the vapor through the food assists in cooking it. It will be noted here that if the relieved areas are not filled substantially flush with the upper surfaces of the plateau areas the vapor will escape laterally and the pockets will not be formed, thus preventing the occurrence of the last-described phenomenon.

In forming cooking utensils in accordance with my invention I prefer to progressively increase the thickness of the bottom part 2 from the outer peripheral part inwardly as disclosed particularly in Fig. 2. This progressive increase in thickness is preferably continued only to a part spaced outwardly from the center of the bottom, leaving a relatively small part 12 of constant thickness at the center of the bottom. I have found that when a bottom constructed in this manner is heated in the cooking operation it will remain substantially flat and the filling material introduced into the relieved areas will not be cracked or spalled by reason of the bottom becoming concave or convex due to heating.

Instead of forming the relieved and filled surface by grooving the upper surface of the bottom of a cooking utensil, a surface in accordance with my invention may be formed by casting or otherwise forming isolated projections extending upwardly from the otherwise flat upper surface of the bottom of a cooking utensil and filling the continuous space between such projections. An embodiment of the invention constructed in this manner is disclosed in Figs. 7 and 8, in which it will be seen that the bottom part 31 of the cooking utensil, which may be cast, is provided with upwardly extending frusto-conical projections 32 which are spaced apart over substantially the entire area of the bottom part of the cooking utensil. The continuous space between these projections is filled, preferably to a substantially flush condition, with a material 34 of the character hereinbefore described.

It will be obvious that the upwardly extending projections 32 of the embodiment of the invention disclosed in Figs. 7 and 8 may be of any desired shape and in Fig. 9 of the drawings there is disclosed a further embodiment of the invention in which these projections are hexagonal in shape.

Figure 10:
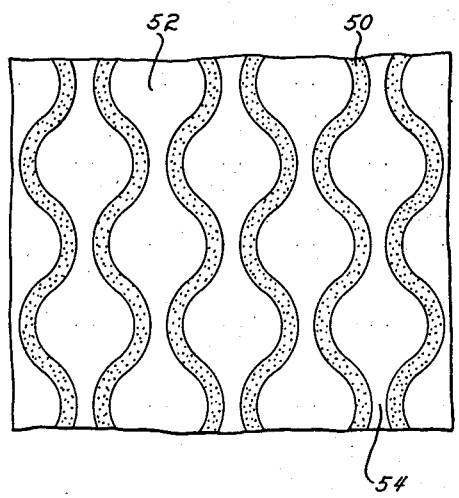
Figs. 10, 11, 12 and 13 are partial plan views of a cooking utensil showing four modified forms of the invention.

While I have found that certain definite advantages are derived by isolating the plateau areas completely, in the manner hereinbefore described and illustrated in Figs. 1 to 9, I have also found that such advantages are obtained to a less degree if the plateau areas are only substantially, but not entirely, isolated. An embodiment of the invention constructed in accordance with this less preferred form is disclosed in Fig. 10 of the drawings. In this embodiment the upper surface of the cooking plate is scored, or otherwise formed, with a plurality of undulating grooves 50 which are so disposed that the oppositely-directed, arcuate undulations of adjacent grooves are opposite each other, thereby forming therebetween a plurality of approximately circular plateau areas 52. The plateau areas between adjacent grooves are connected by narrow necks 54 lying between the parts of the grooves which closely approach each other. By making these neck portions very narrow I provide substantial, although not entire, isolation of the plateau areas between adjacent grooves. The plateau areas between one set of adjacent grooves are of course entirely isolated from those between another pair of adjacent grooves.

Figure 11:
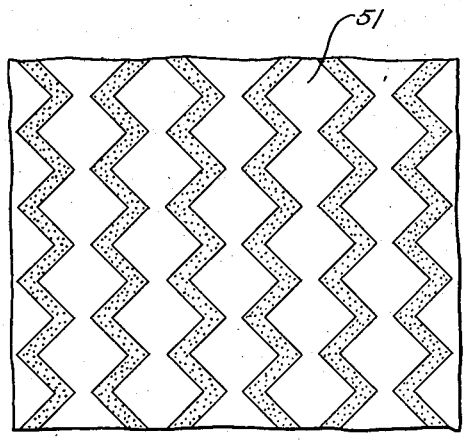

The grooves 50 of this embodiment of the invention need not be wave shaped, and in Fig. 11 there is disclosed a modified form of this embodiment of the invention in which the grooves are of angular, or zig-zag shape, defining therebetween plateau areas 51 of substantially quadrilateral form.

Figure 12:
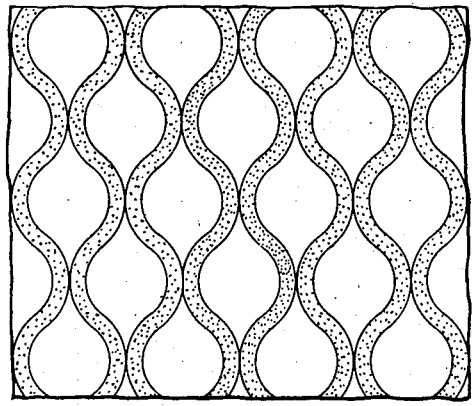
Figure 13:
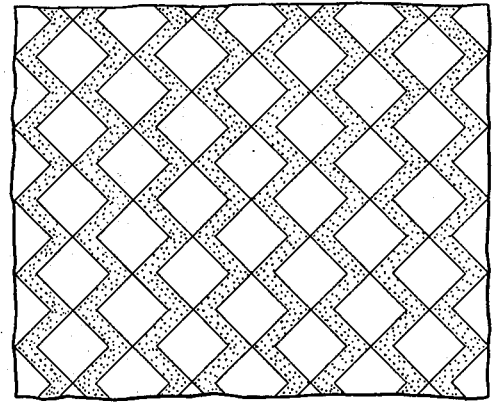

If desired, the grooves of the last two described embodiments may be made to touch at the points where they approach each other and such constructions are illustrated in Figs. 12 and 13 of the drawings, Fig. 12 showing undulating grooves and Fig. 13 showing zig-zag grooves. It will be seen that in these embodiments the plateau areas are entirely isolated.

A further embodiment of the invention is disclosed in Figs. 14 and 15. In this modified form the bottom part 60 of the cooking utensil is provided with spaced parallel depressions 62 which are filled by material 64 of the type and character hereinbefore described. It will be seen that in this embodiment of the invention the cooking utensil has been shown as being of generally rectangular shape and it will be understood, in this connection, that no embodiments of the invention are limited in any way to circular, rectagonal or other shape.

In Figs. 16 and 17 of the drawings there is disclosed a still further embodiment of the invention in which the bottom part 70 of the cooking utensil is provided with a depression 72 which extends over substantially the entire area thereof. The bottom 70 is also provided with spaced parallel upstanding, elongated members 74 which extend upwardly into the depressed area 72. The depressed area is filled with an insulating material 76 of the type and character hereinbefore described, which surrounds the upwardly extending members 74.

In each of the embodiments disclosed in Figs. 14, 15 and 16, 17 the upper surface of the insulating material is made substantially flush with the upper surface of the spaced upwardly extending members, thereby providing a continuous surface on which food is cooked and which consists in alternate bands of insulating material and metallic plateau area. In the embodiment disclosed in Figs. 14 and 15 the plateau areas 60 are connected at their ends while this is not true of the embodiment disclosed in Figs. 16 and 17.

I have found by extensive tests and successful use that cooking utensils formed in the manner taught by this invention provide all of the objects sought by the invention. Such cooking utensils may be used with only a very minimum of grease and, in some cases, with no grease at all. Further, and this is a very important feature, the cooking surface which I have provided may be wetted while hot, thus insuring adequate and uniform greasing under all cooking conditions. The provision of a surface which remains substantially flat when heated makes possible permanent maintenance of the filling material in the relieved areas under all heating conditions.

Throughout this application I have illustrated and described my invention in connection with a cooking utensil of the grill or frying-pan type. It will be apparent, however, that the invention may be applied to cooking devices of all types and without regard to the heating means. Further, it may be embodied in unitary cooking devices, such as electric grills and hot plates, as well as in pans and other devices which do not carry heating means with them.

While I have described and illustrated several embodiments of my invention, it will be apparent to those skilled in the art that other embodiments, as well as modifications of those disclosed, may be made without departing in any way from the spirit or scope of the invention, for the limits of which reference must be had to the appended claims.

What is claimed is:

1. A cooking utensil comprising a metal part on which food is adapted to be placed to be cooked, the upper surface of said part having a depression therein extending over substantially the entire area of said part, a plurality of spaced elongated parallel members integral with said part and rising from the surface forming the bottom of said depression, and non-metallic, absorbent material of less heat conductivity than the material of said part substantially filling the space between and surrounding said members and being attached to said surface and said members.

2. A cooking utensil comprising a metal part on which food is adapted to be placed to be cooked, the upper surface of said part having a plurality of parallel depressions therein, and non-metallic absorbent material of less heat conductivity than the material of said part substantially filling said depressions and attached to the material of said surface defining said depressions.

3. A cooking utensil comprising a metal part on which food is adapted to be placed and a substantial part of the upper surface of which is removed to provide and define a plurality of upwardly-extending protuberances distributed substantially uniformly over said surface each of which terminates at its free end in a substantially flat plateau surface, and non-metallic, absorbent material of less heat conductivity than said part substantially filling the space between said protuberances and attached to the material of said protuberances and surface.

4. A cooking utensil according to claim 3, in which the upper surface of the metal part is removed by forming therein a network of interconnected grooves.

5. A cooking utensil according to claim 3, in which the upper surface of the metal part is removed by forming therein a net work of spaced parallel grooves and other parallel grooves which intersect the first-named parallel grooves.

6. A cooking utensil according to claim 5, in which all of the grooves are straight and those of the first group extend at right angles to those of the second group.

7. A cooking utensil according to claim 5, in which all of the grooves are straight and those of the first group extend at right angles to those of the second group, and a handle connected to said utensil and extending outwardly therefrom at an acute angle to said grooves.

HARRY M. BRAMBERRY.

REFERENCES CITED

The following references are of record in the file of this patent:

UNITED STATES PATENTS

| Number | Name | Date |
|---|---|---|
| 1,460,380 | Hughes | July 3, 1923 |
| 1,732,554 | Detwiler | Oct. 22, 1929 |
| 1,733,450 | Detwiler | Oct. 29, 1929 |
| 2,040,102 | Peron | May 12, 1936 |
| 2,054,953 | Scotson | Sept. 22, 1936 |
| 2,085,220 | Howlett | June 29, 1937 |
| 2,112,521 | Cunningham | Mar. 29, 1938 |

FOREIGN PATENTS

| Number | Country | Date |
|---|---|---|
| 519,258 | Great Britain | Mar. 20, 1940 |
| 543,735 | Great Britain | Mar. 10, 1942 |
| 833,229 | France | July 18, 1938 |